United States Patent
Ishii

(10) Patent No.: US 11,400,420 B2
(45) Date of Patent: Aug. 2, 2022

(54) WATER TREATMENT CHEMICAL, METHOD FOR PREPARING SAME, AND METHOD FOR WASHING POLYAMIDE REVERSE OSMOSIS MEMBRANE

(71) Applicant: KURITA WATER INDUSTRIES LTD., Tokyo (JP)

(72) Inventor: Kazuki Ishii, Tokyo (JP)

(73) Assignee: KURITA WATER INDUSTRIES LTD., Tokyo (JP)

(*) Notice: Subject to any disclaimer, the term of this patent is extended or adjusted under 35 U.S.C. 154(b) by 192 days.

(21) Appl. No.: 16/485,632

(22) PCT Filed: Feb. 28, 2018

(86) PCT No.: PCT/JP2018/007539
§ 371 (c)(1),
(2) Date: Aug. 13, 2019

(87) PCT Pub. No.: WO2018/163934
PCT Pub. Date: Sep. 13, 2018

(65) Prior Publication Data
US 2020/0047130 A1    Feb. 13, 2020

(30) Foreign Application Priority Data
Mar. 7, 2017   (JP) .............................. JP2017-042999

(51) Int. Cl.
*B01D 65/06*   (2006.01)
*B01D 61/02*   (2006.01)
(Continued)

(52) U.S. Cl.
CPC .......... *B01D 65/06* (2013.01); *B01D 61/025* (2013.01); *B01D 71/56* (2013.01); *C02F 1/441* (2013.01)

(58) Field of Classification Search
CPC ...... B01D 65/06; B01D 61/025; B01D 71/56; B01D 2321/162; B01D 2321/168;
(Continued)

(56) References Cited

U.S. PATENT DOCUMENTS 6,440,924 B1    8/2002   Jeschke et al.
10,688,117 B2   6/2020   Nadau Fourcade
(Continued)

FOREIGN PATENT DOCUMENTS

CN    100422387 C    10/2008
CN    103341325 A    10/2013
(Continued)

OTHER PUBLICATIONS

Marlene J. Cran, et. al. Degradation of polyamide reverse osmosis membranes in the presence of chloramine,Desalination, vol. 283, 2011, pp. 58-63, ISSN 0011-9164, https://doi.org/10.1016/j.desal.2011.04.050. (Year: 2011).*

(Continued)

*Primary Examiner* — Bradley R Spies
*Assistant Examiner* — Jeannie McDermott
(74) *Attorney, Agent, or Firm* — Manabu Kanesaka

(57) ABSTRACT

A solution-type water treatment chemical, includes, as one, gluconic acid (salt) and a surfactant having an HLB determined by the following equation (1) satisfying the following equation (2), wherein in a relationship between concentrations of the gluconic acid (salt) and the surfactant and a molecular weight and HLB of the surfactant, the gluconic acid (salt) and the surfactant are contained such that the water treatment chemical does not form a gel or precipitate.

$$HLB = (\Sigma\text{inorganic value}/\Sigma\text{organic value}) \times 10 \quad (1)$$

$$\text{Molecular weight} > -34.4 \times HLB + 1005 \quad (2)$$

17 Claims, 2 Drawing Sheets

(51) Int. Cl.
*B01D 71/56* (2006.01)
*C02F 1/44* (2006.01)

(58) Field of Classification Search
CPC ... B01D 2321/164; B01D 65/02; C02F 1/441;
C11D 1/02; C11D 3/20; C11D 17/00
See application file for complete search history.

(56) References Cited

U.S. PATENT DOCUMENTS

| | | | |
|---|---|---|---|
| 2006/0241005 A1 | 10/2006 | Siebert et al. | |
| 2015/0045276 A1* | 2/2015 | Aoki | C11D 7/34 510/162 |
| 2015/0045278 A1* | 2/2015 | Beisser | C11D 3/2075 510/206 |

FOREIGN PATENT DOCUMENTS

| | | |
|---|---|---|
| CN | 104357848 B | 1/2017 |
| EP | 1126019 A1 | 8/2001 |
| JP | S55-129106 A | 10/1980 |
| JP | 2017-23977 A | 2/2017 |
| WO | 2007/141635 A2 | 12/2007 |
| WO | 2012/163928 A2 | 12/2012 |

OTHER PUBLICATIONS

Julian Eastoe Research Group, Advanced Surfactants and Interfaces, Chapter 3 Microemulsions, May 2003 (Year: 2003).*
Bis(2-ethylhexyl) Sulfosuccinate Sodium Salt 577-11-7_TCI America, https://www.tcichemicals.eom/US/en/p/S0139, accessed May 19, 2021 (Year: 2021).*
Europe Patent Office, "Search Report for European Patent Application No. 18763916.6," dated Nov. 23, 2020.
PCT/ISA/210, "International Search Report for International Application No. PCT/JP2018/007539," dated Apr. 10, 2018.
Japan Patent Office, "Office Action for Japanese Patent Application No. 2017-042999," dated Apr. 3, 2018.
Taiwan Patent Office, "Office Action for Taiwanese Patent Application No. 107107392," dated Dec. 11, 2020.

* cited by examiner ated due to contamination. The present invention also relates to a washing liquid for a polyamide RO membrane including such a water treatment chemical, and to a method for washing a polyamide reverse osmosis membrane using the washing liquid for a polyamide reverse osmosis membrane.

WATER TREATMENT CHEMICAL, METHOD FOR PREPARING SAME, AND METHOD FOR WASHING POLYAMIDE REVERSE OSMOSIS MEMBRANE

TECHNICAL FIELD

The present invention relates to a water treatment chemical, and a method for preparing the same, which is suitable as a washing liquid for effectively restoring the performance of a polyamide reverse osmosis (RO) membrane, in particular an aromatic polyamide RO membrane, used in a water treatment field such as seawater desalination, whose performance, such as permeation flux, differential pressure, and desalting rate, has deteriorated due to contamination. The present invention also relates to a washing liquid for a polyamide RO membrane including such a water treatment chemical, and to a method for washing a polyamide reverse osmosis membrane using the washing liquid for a polyamide reverse osmosis membrane.

BACKGROUND ART

Measures to save water by increasing water recovery rate are being actively carried out using an RO membrane system in the desalination of seawater and brackish water and in wastewater recovery systems. In an RO membrane system, the RO membrane is contaminated by various contaminants, such as inorganic matter and organic matter. Since contamination of the RO membrane reduces the performance of the desalting rate, differential pressure, and permeation flux, it is desirable to develop a washing technology that effectively restores the performance of a contaminated RO membrane.

In seawater desalination plants using RO membranes, aromatic polyamide RO membranes having an excellent desalination performance are widely used, but in desalination RD membrane plants, problems due to biofouling frequently occur. It is thus desirable to develop a washing technology that effectively restores the performance of an RD membrane contaminated with microorganisms and organic matter.

Since aromatic polyamide RO membranes have a low resistance to chlorine, they cannot be treated with chlorine under operating conditions like cellulose acetate RO membranes. Aromatic polyamide RO membranes are more susceptible to microorganism and organic matter contamination than cellulose acetate RO membranes.

As a washing agent for aromatic polyamide RD membranes having a low chlorine resistance, in general, washing agent containing an anionic surfactant as a main component, and mainly higher fatty acid salts, alkyl sulfates, sulfonates, and the like, have conventionally been used. Anionic surfactant and chelating agents are also used in combination therewith to improve washing power. As a chelating agent, EDTA and phosphonate are mainly used.

When an RO membrane is heavily contaminated, conventional washing agents may not be able to fully restore membrane performance.

In recent years, with the regulation of phosphorus concentrations in wastewater, a washing agent free of phosphorus is desired.

The inventors have discovered that aldonic acids such as gluconic acid or a salt thereof are promising as a washing agent for polyamide RO membranes, and previously filed a patent application for a washing agent for an RD membrane including an aldonic acid and/or a salt thereof (PTL1). However, with that washing agent, when used in combination with an anionic surfactant to enhance the washing effect, there are some agents that affect product stability in a low temperature range (e.g., 6° C. or less), and the washing liquid forms a gel or precipitates during storage, and cannot be used as a washing liquid.

PTL1: JP 2017-023977 A

SUMMARY OF INVENTION

It is an object of the present invention to provide a water treatment chemical, a washing liquid for a polyamide RO membrane, and a method for washing a polyamide RO membrane using this washing liquid, which include, as one component, gluconic acid and/or a salt thereof (hereinafter referred to as "gluconic acid (salt)") and a surfactant, that does not form a gel or precipitate even in a low temperature range of 6° C. or less.

The present inventors discovered that, for a water treatment chemical in which a surfactant satisfying a specific relationship between molecular weight and HLB and gluconic acid (salt) are formed as one component, the above problems can be solved by preparing the water treatment chemical in terms of a relationship between the concentration of the gluconic acid (salt) and the surfactant and the molecular weight and the HLB of the surfactant such that gelation and precipitation do not occur.

The present invention is summarized as follows.

[1] A solution-type water treatment chemical, comprising, as one component, gluconic acid and/or a salt thereof (hereinafter referred to as "gluconic acid (salt)") and a surfactant having an HLB determined by the following equation (1) satisfying the following equation (2), wherein in a relationship between concentrations of the gluconic acid (salt) and the surfactant and a molecular weight and HLB of the surfactant, the gluconic acid (salt) and the surfactant are contained such that the water treatment chemical does not form a gel or precipitate:

$$HLB = (\Sigma \text{inorganic value} / \Sigma \text{organic value}) \times 10 \quad (1)$$

$$\text{Molecular weight} > -34.4 \times HLB + 1005 \quad (2)$$

[2] The water treatment chemical according to [1], wherein the water treatment chemical does not form a gel or precipitate at a solution temperature of 6° C. or less.

[3] The water treatment chemical according to [1] or [2], wherein the surfactant is an anionic surfactant having a molecular weight of 380 or more and an HLB of 15 or more.

[4] A solution-type water treatment chemical, comprising, as one component, gluconic acid and/or a salt thereof (hereinafter referred to as "gluconic acid (salt)") and an anionic surfactant having an HLB determined by the following equation (1) of 15 or more and a molecular weight of 380 or more, wherein in a relationship between concentrations of the gluconic acid (salt) and the surfactant and a molecular weight and HLB of the surfactant, the gluconic acid (salt) and the surfactant are contained such that the water treatment chemical does not form a gel or precipitate:

$$HLB = (\Sigma \text{inorganic value} / \Sigma \text{organic value}) \times 10 \quad (1)$$

[5] The water treatment chemical according to any one of [1] to [4], wherein the gluconic acid (salt) has a concentration of 20 wt % or less and the surfactant has a concentration of 10 wt % or less.

[6] The water treatment chemical according to any one of [1] to [5], further comprising an alkali agent.

[7] The water treatment chemical according to any one of [1] to [6], further comprising a polyol compound having a molecular weight of 1000 or less.

[8] A washing liquid for a polyamide reverse osmosis membrane, comprising the water treatment chemical according to any one of [1] to [7].
[9] A method for washing a polyamide reverse osmosis membrane using the washing liquid according to [8].
[10] A method for preparing a solution-type water treatment chemical comprising, as one component, gluconic acid and/or a salt thereof (hereinafter referred to as "gluconic acid (salt)") and a surfactant having an HLB determined by the following equation (1) satisfying the following equation (2), wherein in a relationship between concentrations of the gluconic acid (salt) and the surfactant and a molecular weight and HLB of the surfactant, the gluconic acid (salt) and the surfactant are mixed such that the water treatment chemical does not form a gel or precipitate:

$$HLB=(\Sigma\text{inorganic value}/\Sigma\text{organic value})\times 10 \quad (1)$$

$$\text{Molecular weight}>-34.4\times HLB+1005 \quad (2)$$

[11] The method for preparing a water treatment chemical according to [10], wherein the water treatment chemical does not form a gel or precipitate at a solution temperature of 6° C. or less.
[12] The method for preparing a water treatment chemical according to [10] or [11], wherein the surfactant is an anionic surfactant having a molecular weight of 380 or more and an HLB of 15 or more.
[13] A method for preparing a solution-type water treatment chemical comprising, as one component, gluconic acid and/or a salt thereof (hereinafter referred to as "gluconic acid (salt)") and an anionic surfactant having an HLB determined by the following equation (1) of 15 or more and a molecular weight of 380 or more, wherein in a relationship between concentrations of the gluconic acid (salt) and the surfactant and a molecular weight and HLB of the surfactant, the gluconic acid (salt) and the surfactant are mixed such that the water treatment chemical does not form a gel or precipitate:

$$HLB=(\Sigma\text{inorganic value}/\Sigma\text{organic value})\times 10 \quad (1)$$

[14] The method for preparing a water treatment chemical according to any one of [10] to [13], wherein the gluconic acid (salt) is mixed so as to have a concentration of 20 wt % or less and the surfactant is mixed so as to have a concentration of 10 wt % or less.
[15] The method for preparing a water treatment chemical according to any one of [10] to [14], further comprising mixing an alkali agent.
[16] The method for preparing a water treatment chemical according to any one of [10] to [15], further comprising mixing a polyol compound having a molecular weight of 1000 or less.
[17] A method for preparing a washing liquid for a polyamide reverse osmosis membrane, the method comprising preparing the washing liquid for a polyamide reverse osmosis membrane by the method according to any one of [10] to [16].
[18] A method for washing a polyamide reverse osmosis membrane, the method comprising washing a polyamide reverse osmosis membrane by using the washing liquid for a polyamide reverse osmosis membrane prepared by the method according to [17].

Advantageous Effects of Invention

According to the present invention, a stable one-component water treatment chemical including gluconic acid (salt) and a surfactant can be realized. Further, according to the present invention, by using this water treatment chemical as a washing liquid, a polyamide RD membrane that has been contaminated as a result of being used to treat water, and whose performance such as permeation flux, differential pressure, and desalting rate has deteriorated, can be effectively washed to restore the membrane performance.

DESCRIPTION OF EMBODIMENT

Figure 1A:
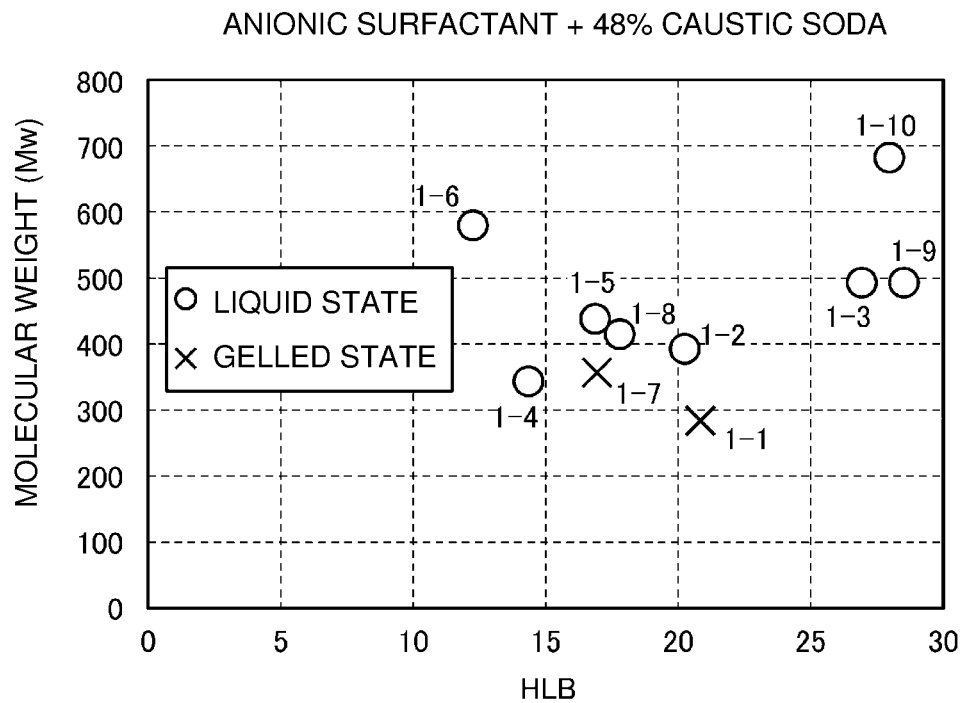
FIGS. 1a and 1b are graphs showing the presence or absence of gelation in terms of a relationship between the molecular weight and the HLB of the surfactant of the water treatment chemicals prepared in Experimental Example 1.

An embodiment of the present invention will be described in detail below.
[Water Treatment Chemical]
The water treatment chemical of the present invention is a solution-type water treatment chemical, including, as one component, gluconic acid (salt) and a surfactant having an HLB determined by the following equation (1) satisfying the following equation (2), or an anionic surfactant having an HLB determined by the following equation (1) of 15 or more and a molecular weight of 380 or more. The water treatment chemical of the present invention is characterized in that, in a relationship between concentrations of the gluconic acid (salt) and the surfactant and a molecular weight and HLB of the surfactant, the gluconic acid (salt) and the surfactant are contained such that the water treatment chemical does not form a gel or precipitate. The water treatment chemical of the present invention is prepared by mixing the gluconic acid (salt) and the surfactant in water in a combination and concentration such that gelation and precipitation do not occur.

$$HLB=(\Sigma\text{inorganic value}/\Sigma\text{organic value})\times 10 \quad (1)$$

$$\text{Molecular weight}>-34.4\times HLB+1005 \quad (2)$$

The HLB of the surfactant is determined by the following equation (1).

$$HLB=(\Sigma\text{inorganic value}/\Sigma\text{organic value})\times 10 \quad (1)$$

The HLB value shown in equation (1) is widely known by those skilled in the art as the HLB calculation method by Oda et al. (Ryohei Oda et al., "Surfactant Synthesis and Their Applications", Maki Shoten (1964)). The "inorganic value" and the "organic value" are determined by summing values predetermined for each group (site) of the compound for each whole molecule. For example, these values may be physical property values known by those skilled in the art as described in "Emulsification/Solubilization Technology" (Kogaku Tosho KK, Susumu Tsuji).

The molecular weight of the surfactant is the sum of the atomic weights in its molecular formula.

Surfactants that satisfy equation (2) tend not to form a gel or precipitate even in an aqueous solution of the surfactant alone or in an aqueous solution including the surfactant and the gluconic acid (salt). For this reason, in the present invention, a surfactant satisfying equation (2) is used.

As such a surfactant, in particular, an anionic surfactant having a molecular weight of 380 or more, for example 380 to 700, and particularly 380 to 600, and an HLB of 15 or more, for example 15 to 26, is less likely to form a gel or precipitate, and also has an excellent polyamide RD membrane washing effect, and is thus preferable.

From the viewpoints that it is less likely to form a gel or precipitate, a surfactant including an ethylene oxide group as a hydrophobic group is preferably used. From the viewpoint of the washing effect of the polyamide RO membrane, as the surfactant, it is preferable to use an anionic surfactant having a sulfonate group.

Examples of particularly suitable anionic surfactants include dialkyl sulfosuccinic acid, polyoxyethylene alkyl ether acetic acid, alkyl diphenyl disulfonic acid, and alkali metal salts such as sodium salts and potassium salts thereof.

The water treatment chemical of the present invention may be prepared by, for example, determining the combination and suitable concentration of the gluconic acid (salt) and the surfactant as follows.

First, a surfactant satisfying equation (2) and gluconic acid (salt) are added to water according to the blend of that combination and then mixed. The presence or absence of gelation and precipitation at a low temperature range, for example, 6° C. or less, and more specifically 4 to 6° C., is checked, and if there is no gelation or precipitation, that blend is used. If gelation or precipitation occurs, the concentration of one or both of the gluconic acid (salt) and the surfactant is reduced from that of the blend, and the presence or absence of gelation and precipitation is again checked. If gelation or precipitation occurs even after repeating this operation 2 to 10 times, it is judged that the combination of that surfactant with the gluconic acid (salt) is not preferable. Then, using another surfactant, the suitable concentration is again checked in the same manner.

If gelation and precipitation do not occur in a high concentration aqueous solution of the surfactant and the gluconic acid (salt), gelation or precipitation will not occur in a lower concentration aqueous solution, and therefore it is also preferable to confirm the presence or absence of gelation and precipitation of a higher concentration aqueous solution than the usage concentration, and confirm in advance the combinations of gluconic acid (salt) and surfactant for which gelation and precipitation do not occur.

An example of such a case is to, for example, perform the confirmation of the presence or absence of gelation and precipitation by using an aqueous solution having a surfactant concentration of 10 wt % or less, for example 0.1 to 5 wt %, and a gluconic acid (salt) concentration of 20 wt % or less, for example 10 to 20 wt %.

When the water treatment chemical of the present invention is used as a washing liquid of the polyamide RD membrane described later, it is preferable to set the concentration of the surfactant to 0.01 to 5 wt %, especially 0.01 to 1 wt %, and the concentration of the gluconic acid (salt) to 0.1 to 5 wt %, especially 0.1 to 2 wt %. The washing liquid is preferably alkaline with a pH of preferably 8 or more, particularly 10 to 14, and especially 11 to 13. Therefore, it is preferable to perform the confirmation of the above-mentioned suitable concentration at which gelation and precipitation do not occur in such a concentration range under those pH conditions.

There is no particular limitation on the mixing order of each of the chemicals when preparing the water treatment chemical of the present invention, but the order of solid content liquid content is generally used. In general, the surfactant is admixed to the gluconic acid (salt), and then an alkaline aqueous solution (pH regulator) such as sodium hydroxide is added and mixed.

[Washing Liquid for Polyamide RO Membrane]

The washing liquid for a polyamide RO membrane of the present invention is a one-component water treatment chemical prepared as described above, which includes gluconic acid (salt) and a specific surfactant and does not form a gel or precipitate, and which has an excellent polyamide RO membrane washing effect.

Although the details of the action mechanism of the washing effect through combining the gluconic acid (salt) and the surfactant are not clear, they are considered to be as follows.

When a peeling effect and a hydrolysis effect under alkaline conditions during washing is combined with a heavy metal chelating action by the gluconic acid (salt), as well as a hydrophilization/peeling effect on contaminants by the surfactant, particularly by an anionic surfactant, and furthermore, when combined with a polyol compound having a molecular weight of 1000 or less, these effects act in a synergistic manner due to the polyol compound applying a substitution/peeling effect on the contaminants, whereby the alkali washing effect is improved.

The washing liquid for a polyamide RO membrane of the present invention is, among polyamide RO membranes, particularly effective for washing an aromatic polyamide RO membrane. In particular, the present invention is effective for RO membranes used for seawater desalination, in which contamination combining organic matter contamination and inorganic matter contamination occurs, and conventional washing agents cannot obtain a sufficient washing effect.

The washing liquid for a polyamide RO membrane of the present invention is usually an aqueous solution including gluconic acid (salt) and the above-mentioned specific surfactant, and is preferably a pH-alkaline aqueous solution including an alkali agent.

Examples of the alkali agent used in the washing liquid for a polyamide RO membrane of the present invention include hydroxides of alkali metals, such as sodium hydroxide and potassium hydroxide.

The washing liquid for a polyamide RO membrane of the present invention may further contain a polyol compound having a molecular weight of 1000 or less. By containing a polyol compound having a molecular weight of 1000 or less, the wettability of the active substance can be enhanced, and the washing effect can be further enhanced.

The polyol compound is a compound having a plurality of OH groups. Examples thereof include: alkylene glycols such as ethylene glycol, propylene glycol, and trimethylene glycol; glycerin; polyglycols such as diethylene glycol and other polyalkylene glycols; and sugar alcohols such as erythritol and mannitol. Among these, alkylene glycols such as ethylene glycol, propylene glycol, and trimethylene glycol are preferable from the viewpoint of availability and economics. If the molecular weight of the polyol compound is a high molecular weight of more than 1000, the polyol compound may itself become a contaminant in the membrane, so in the present invention, a polyol compound having a molecular weight of 1000 or less, and preferably 400 or less, is used.

The washing liquid for a polyamide RO membrane of the present invention may further include a solvent, for example, an alcohol such as ethanol, an amine such as monoethanolamine, diethanolamine, and triethanolamine, a ketone such as acetone, and an ether such as dimethyl ether, diethyl ether, and diethylene glycol monomethyl ether.

Each of these may be used alone or in combination of two or more.

Although the concentration of the gluconic acid (salt) in the washing liquid for a polyamide RO membrane of the present invention depends on the pH of the washing liquid, and the presence or absence, type, concentration etc. of other washing agents used together therewith, the concentration is preferably 0.1 wt % or more, and particularly preferably 0.3 wt % or more. When the concentration of the gluconic acid (salt) is equal to or more than the above lower limit, the washing effect of the RO membrane as a result of using the gluconic acid (salt) can be sufficiently obtained. However, even if the concentration of the gluconic acid (salt) is too high, a corresponding increase in washing effect is not obtained, and to the contrary, the TOC concentration is increased when the washing liquid is discarded. The concentration of the gluconic acid (salt) in the washing liquid for a polyamide RO membrane of the present invention is preferably 5 wt % or less, and particularly preferably 2 wt % or less.

The surfactant concentration in the washing liquid for a polyamide RO membrane of the present invention is preferably 0.01 to 5 wt %, particularly preferably 0.01 to 1 wt %, and especially preferably 0.03 to 0.5 wt %. If the surfactant concentration is too low, the dispersion effect by the surfactant and the effect of improving the washing action cannot be sufficiently obtained. If the concentration is too high, surfactant association becomes rather strong, which may lower the washing effect.

The washing liquid for a polyamide RO membrane of the present invention preferably has a pH of 8 or more, and particularly preferably 10 to 14, in view of its washing effect. When the pH of the washing liquid is 8 or more, the permeability of the membrane can be sufficiently restored by the washing. The higher the pH of the washing liquid, the better the washing effect. However, if the pH is too high, handleability as a washing liquid deteriorates, and the risk of the RO membrane degrading increases. The pH of the washing liquid is preferably 14 or less, and more preferably 11 or more and 13 or less.

The washing liquid for a polyamide RO membrane of the present invention is prepared so as to have the above-mentioned preferable pH by the addition of the above-mentioned alkali agent.

When the washing liquid for a polyamide RO membrane of the present invention includes a polyol compound having a molecular weight of 1000 or less, the concentration of the polyol compound having a molecular weight of 1000 or less in the washing liquid for a polyamide RO membrane of the present invention is preferably 0.1 to 10 wt %, and particularly preferably 0.5 to 5 wt %. This is because if the concentration of the polyol compound having a molecular weight of 1000 or less is too low, the substitution/peeling effect of the washing agent component by the polyol compound cannot be sufficiently obtained, and if the concentration is too high, the TOC concentration when discarding the washing liquid is increased and they are not preferable.

[Method for Washing Polyamide RO Membrane]

The method for washing the polyamide RO membrane using the washing liquid for a polyamide RO membrane of the present invention is not particularly limited, as long as the washing liquid is brought into contact with the polyamide RO membrane. Usually, immersion washing is performed in which the washing liquid is introduced to the raw water side of the RO membrane module and allowed to stand. Circulation washing may also be performed, in which the washing liquid is circulated before and/or after immersion washing.

In the case of performing another kind of washing, for example, washing with an alkaline aqueous solution or an acidic aqueous solution, before or after the washing with the washing liquid for a polyamide RO membranes of the present invention, usually, the same immersion washing or immersion washing and circulation washing as described above is employed.

Examples of the washing with a washing liquid other than the washing liquid for a polyamide RO membrane of the present invention include washing with an alkaline aqueous solution not including the gluconic acid (salt) and the surfactant to be performed after the washing with the washing liquid for a polyamide RO membrane of the present invention. As the alkali agent of the alkaline aqueous solution, the examples described above as alkali agents to be used for the washing liquid for a polyamide RD membrane of the present invention can be used. The pH of the alkaline aqueous solution is preferably 10 or more, and particularly preferably 11 to 13, from the viewpoint of washing effect and handleability.

Acidic washing, which is effective for removal of scale and metal colloids, may be performed. For such acidic washing, an aqueous solution including one or more kinds of acids such as hydrochloric acid, nitric acid, citric acid, and oxalic acid can be used. The pH of the acidic aqueous solution is preferably 4 or less, and particularly preferably 1 to 3, from the viewpoint of washing effect and handleability.

The immersion washing time carried out using the washing liquid for a polyamide RO membrane of the present invention or another washing liquid is not particularly limited, as long as the target recovery rate in membrane performance can be obtained. The immersion washing time is usually about 2 to 24 hours. In the case of performing circulation washing before or after immersion washing, there is also no particular limitation on the circulation washing time, as long as the target recovery rate in membrane performance can be obtained. The circulation washing time is usually about 0.5 to 3 hours.

When combining the washing with the washing liquid for a polyamide RO membrane of the present invention with washing with an alkaline aqueous solution and/or an acid aqueous solution, the washing order is not particularly limited. The acidic washing with an acidic aqueous solution is preferably performed before and/or after the washing with the washing liquid for a polyamide RO membrane of the present invention because the washing effect can be enhanced by removing the scale component.

After the washing with the above-mentioned washing liquid, usually, high purity water, such as pure water, is passed to perform final washing. Thereafter, operation of the RO membrane system is resumed.

EXAMPLE

The present invention will now be more specifically described by experimental examples, examples and comparative examples.

Experimental Example 1

Using the anionic surfactants shown in Table 1, sodium gluconate (Na gluconate), and an aqueous solution of 48 wt % sodium hydroxide (48% caustic soda), one-component chemical solutions were prepared in the combinations shown in Table 2, having a pH of 12 and containing 3 wt % (solid content concentration) of the anionic surfactant, 10 wt % of Na gluconate (however, in Compositions 1-1 to 1-10, no Na gluconate was used), and an NaOH concentration of 0.1 wt %.

TABLE 1

| Anionic Surfactant No. | Chemical Formula | Molecular Weight | HLB | Value on Right Side of Equation (2) | Whether or Not Equation (2) is Satisfied |
|---|---|---|---|---|---|
| AS-1 | $C_{12}H_{25}OSO_3Na$ | 288 | 20.8 | 289 | x |
| AS-2 | $C_{12}H_{25}O(EO)_nSO_3Na$  n = 2.5 | 398 | 20.2 | 310 | x |
| AS-3 | $C_9H_{19}(C_6H_3)O(C_6H_4)$ with two $SO_3Na$ | 500 | 26.9 | 80 | ○ |
| AS-4 | $C_{12}H_{25}(C_6H_4)SO_3Na$ | 348 | 14.3 | 513 | x |
| AS-5 | $C_8H_{17}OCOCH_2$ / $C_8H_{17}OCOCH—SO_3Na$ | 444 | 16.8 | 427 | ○ |
| AS-6 | $C_{13}H_{27}OCOCH_2$ / $C_{13}H_{27}OCOCH—SO_3Na$ | 584 | 12.2 | 585 | x |
| AS-7 | $C_{12}H_{25}O[EO]_nCH_2COONa$  n = 3 | 354 | 16.9 | 424 | x |
| AS-8 | $C_{13}H_{27}O[EO]_nCH_2COONa$  n = 3 | 412 | 17.8 | 393 | ○ |
| AS-9 | $C_{12}H_{25}O[EO]_nCHSO_3Na$ / $CH_2COONa$  n = 3 | 514 | 28.5 | 25 | ○ |
| AS-10 | $C_{11}H_{23}CONHCH_2CH_2O[EO]_nCOCHSO_3Na$ / $CH_2COONa$  n = 5 | 687 | 27.9 | 45 | ○ |

\* $C_6H_4$, $C_6H_3$: benzene ring
EO: ethylene oxide group

Specifically, the anionic surfactant shown in Table 2, Na gluconate (however, in Compositions 1-1 to 1-10, no Na gluconate was used), and 48% caustic soda were mixed in that order into water in a glass sample bottle (volume 30 mL), the volume of the mixture was adjusted with water and sufficiently stirred, and then the mixture was allowed to stand at 5.2° C. for 24 hours. Then, the sample bottle was taken out and stirred. Mixtures in a liquid state were evaluated as "○" and mixtures that were in a solidified state were evaluated as a gel "x". The test results were plotted on a graph based on the relationship between the molecular weight of the used surfactant and the HLB, and the results are shown in FIGS. 1a and 1b.

TABLE 2

| | Anionic Surfactant No. | Chelating agent | Alkaline aqueous solution | Balance |
|---|---|---|---|---|
| Composition 1-1 | AS-1 | — | 48% caustic soda | water |
| Composition 1-2 | AS-2 | — | 48% caustic soda | water |
| Composition 1-3 | AS-3 | — | 48% caustic soda | water |
| Composition 1-4 | AS-4 | — | 48% caustic soda | water |
| Composition 1-5 | AS-5 | — | 48% caustic soda | water |
| Composition 1-6 | AS-6 | — | 48% caustic soda | water |
| Composition 1-7 | AS-7 | — | 48% caustic soda | water |
| Composition 1-8 | AS-8 | — | 48% caustic soda | water |
| Composition 1-9 | AS-9 | — | 48% caustic soda | water |
| Composition 1-10 | AS-10 | — | 48% caustic soda | water |
| Composition 1-11 | AS-1 | Na gluconate | 48% caustic soda | water |
| Composition 1-12 | AS-2 | Na gluconate | 48% caustic soda | water |
| Composition 1-13 | AS-3 | Na gluconate | 48% caustic soda | water |
| Composition 1-14 | AS-4 | Na gluconate | 48% caustic soda | water |
| Composition 1-15 | AS-5 | Na gluconate | 48% caustic soda | water |
| Composition 1-16 | AS-6 | Na gluconate | 48% caustic soda | water |
| Composition 1-17 | AS-7 | Na gluconate | 48% caustic soda | water |
| Composition 1-18 | AS-8 | Na gluconate | 48% caustic soda | water |
| Composition 1-19 | AS-9 | Na gluconate | 48% caustic soda | water |
| Composition 1-20 | AS-10 | Na gluconate | 48% caustic soda | water |

Figure 1B:
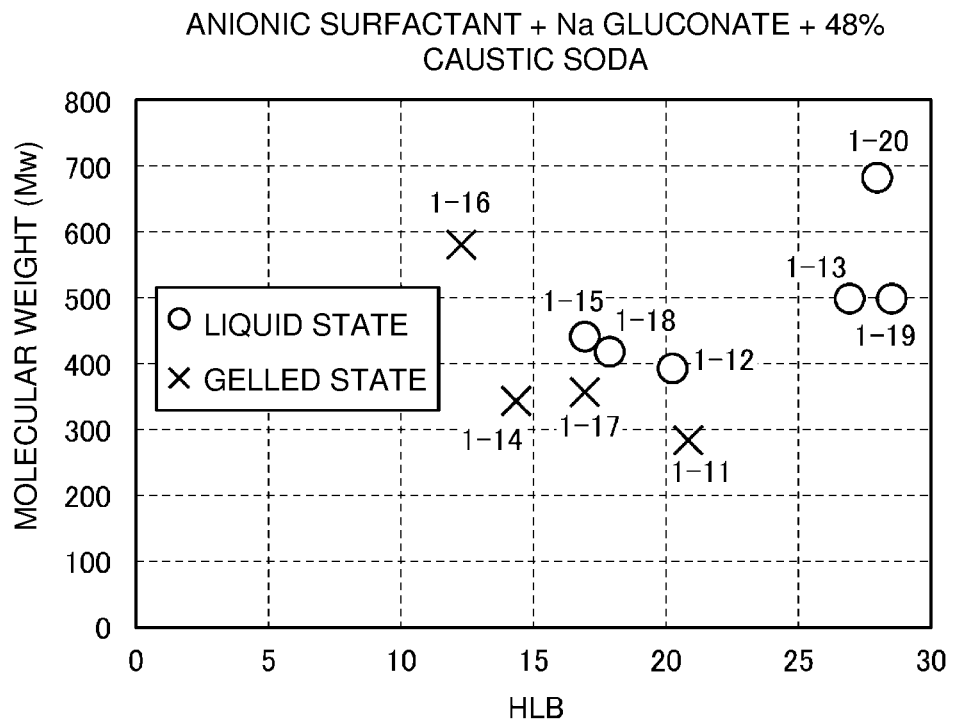

The following can be understood from the results of FIGS. 1a and 1b.

As shown in FIG. 1a, even for the anionic surfactants that did not form a gel when Na gluconate was not included, some of those anionic surfactants did form a gel when Na gluconate coexisted, as shown in FIG. 1b. However, for anionic surfactants having a molecular weight satisfying the condition "molecular weight>−34.4×HLB+1005", and in particular anionic surfactants having a molecular weight of 380 or more and an HLB of 15 or more, there exists a region where gelation does not occur.

For example, Compositions 1-12 and 1-17 to 1-20 used AS-2 and 7 to 10, which are anionic surfactants containing an ethylene oxide group (EO group) as a hydrophobic group. Of those, the compositions that used an anionic surfactant having an HLB of 17.5 or more did not form a gel.

Examples 1 and 2, Comparative Examples 1 to 12

Figure 2:
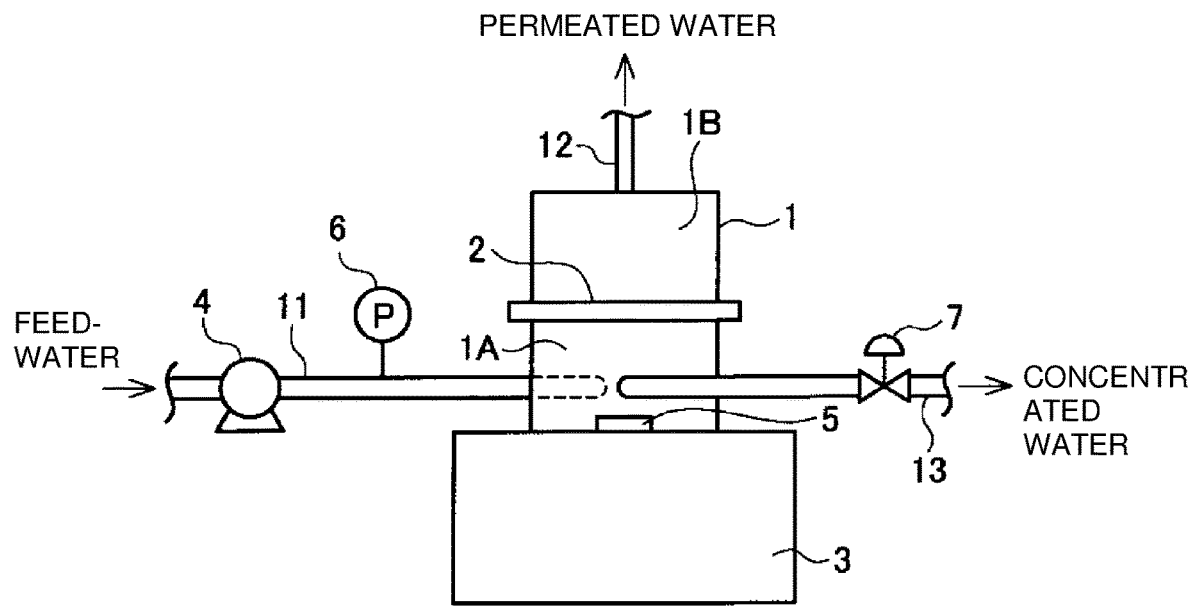
FIG. 2 is a schematic view showing a configuration of a flat membrane test apparatus used in the examples.
Figure 3:
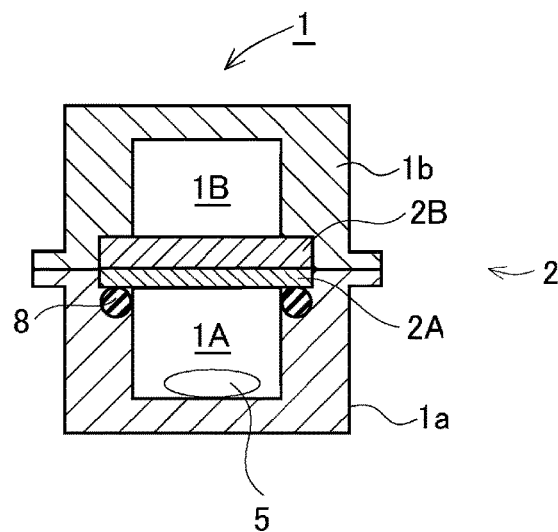
FIG. 3 is a cross-sectional view showing the structure of a sealed container of the flat membrane test apparatus of FIG. 2.

The washing effect of the RD membrane was examined in accordance with the following test methods using the flat membrane test apparatus shown in FIGS. 2 and 3.

In this flat membrane test apparatus, RO membrane feed-water is supplied from a pipe 11 by a high-pressure pump 4 to a raw water chamber 1A of a sealed container 1, on a lower side of a flat membrane cell 2 in which the RO membrane is set. As shown in FIG. 3, the sealed container 1 is constructed from a lower case 1a on the raw water chamber 1A side and an upper case 1b on a permeated water chamber 1B side. The flat membrane cell 2 is fixed between the lower case 1a and the upper case 1b via an O-ring 8. The flat membrane cell 2 is supported on the permeated water side of an RD membrane 2A by a porous support plate 2B. The inside of the raw water chamber 1A on the lower side of the flat membrane cell 2 is stirred by rotating a stir bar 5 with a stirrer 3. The RD membrane permeated water is extracted from the pipe 12 through the permeated water chamber 1B on the upper side of the flat membrane cell 2. Concentrated water is extracted from a pipe 13. The pressure in the sealed container 1 is adjusted by a pressure gauge 6 provided in the feed-water pipe 11 and a pressure regulating valve 7 provided in the concentrated water extraction pipe 13.

<Test Methods>

An aromatic polyamide RO membrane "TM-820A" (new membrane, permeation flux 0.6 [m$^3$/(m$^2$·day)]) manufactured by Toray Industries Inc. was loaded into the RO apparatus of a seawater desalination RD system, and operated for 3 years. The membrane after the operation was taken out from the RO apparatus and disassembled to obtain a flat membrane sample of the contaminated membrane. This flat membrane sample was cut into a circle and placed in the flat membrane test apparatus shown in FIGS. 2 and 3, which can be loaded with a membrane of the same size, and the test was conducted according to the following procedure.

(1) After passing pure water at 1.55 MPa for 24 hours through the pre-washed, contaminated membrane, an aqueous solution of 2000 mg/L sodium chloride was passed at 1.55 MPa as the evaluation water to determine the permeation flux (permeation flux before washing).

(2) After that, each washing liquid shown in Table 3 was supplied and washing was performed. In each case, the washing operation was performed in the order of 2 hours of circulation washing→15 hours of immersion washing→2 hours of circulation washing. The operating pressure during circulation washing was 0.2 MPa.

(3) After that, in the same manner as the above-mentioned (1), pure water was passed for 24 hours, and an aqueous solution of 2000 mg/L sodium chloride was passed at 1.55 MPa as the evaluation water to determine the permeation flux (permeation flux after washing).

(4) The recovery rate was calculated by the following equation.

$$\text{Recovery rate}[-]=F1/F2$$

Here, F1 is a value calculated based on the permeation flux after washing and the permeation flux before washing. F2 is F1 in Comparative Example 1, in which washing was performed using an aqueous solution of sodium hydroxide having a pH of 11.

In each case, the concentration of the anionic surfactant in the washing liquid was 0.15 wt % in terms of solid content concentration, and when sodium gluconate was used, the sodium gluconate concentration was 0.5 wt %. When propylene glycol was used, the propylene glycol concentration was 2 wt %. All of the washing liquids were adjusted to a pH 11 aqueous solution by adding sodium hydroxide.

The results are shown in Table 3. In Table 3, "GANa" represents sodium gluconate, and "PG" represents propylene glycol. Table 3 also shows the test results, which were obtained in Experimental Example 1, of the presence or absence of gelation by each surfactant or combination of surfactant and sodium gluconate.

TABLE 3

| | Washing Liquid | | | Permeation Flux [m$^3$/(m$^2$·day)] | | Recovery |
| | | | Presence/ | | | Rate |
| | Washing Agent Component | pH | Absence of Gel | Before Washing | After Washing | [—] |
|---|---|---|---|---|---|---|
| Comparative Example 1 | NaOH | 11 | ○ | 0.39 | 0.41 | 1.00 |
| Comparative Example 2 | NaOH + AS-1 | 11 | X | 0.38 | 0.41 | 1.02 |
| Comparative Example 3 | NaOH + AS-2 | 11 | ○ | 0.35 | 0.38 | 1.03 |
| Comparative Example 4 | NaOH + AS-3 | 11 | ○ | 0.32 | 0.39 | 1.16 |
| Comparative Example 5 | NaOH + AS-4 | 11 | ○ | 0.36 | 0.43 | 1.13 |
| Comparative Example 6 | NaOH + AS-6 | 11 | ○ | 0.40 | 0.31 | 0.73 |
| Comparative Example 7 | NaOH + AS-7 | 11 | X | 0.36 | 0.42 | 1.15 |
| Comparative Example 8 | NaOH + AS-8 | 11 | ○ | 0.37 | 0.38 | 1.08 |

TABLE 3-continued

| | Washing Liquid | | | Permeation Flux [m³/(m²·day)] | | Recovery Rate [—] |
|---|---|---|---|---|---|---|
| | Washing Agent Component | pH | Presence/ Absence of Gel | Before Washing | After Washing | |
| Comparative Example 9 | NaOH + AS-9 | 11 | ○ | 0.37 | 0.37 | 0.95 |
| Comparative Example 10 | NaOH + AS-10 | 11 | ○ | 0.39 | 0.40 | 1.06 |
| Comparative Example 11 | NaOH + AS-5 | 11 | ○ | 0.37 | 0.45 | 1.16 |
| Comparative Example 12 | NaOH + AS-4 + GANa | 11 | X | 0.39 | 0.44 | 1.07 |
| Example 1 | NaOH + AS-5 + GANa | 11 | ○ | 0.37 | 0.46 | 1.18 |
| Example 2 | NaOH + AS-5 + GANa + PG | 11 | ○ | 0.36 | 0.47 | 1.24 |

The following can be understood from the results of Comparative Examples 1 to 12 in Table 3.

From the results of Experimental Example 1, many of the anionic surfactants having an ethylene oxide group as the hydrophobic group did not form a gel easily, but sulfonate surfactants are effective in terms of their washing effect of a polyamide RO membrane.

Among AS-4 and AS-5, which are sulfonate surfactants, because AS-4 formed a gel in the presence of sodium gluconate, its washing effect was poor (Comparative Example 12), and its washing effect was in fact inferior than when sodium gluconate was not added (Comparative Example 3).

AS-5 did not form a gel even in the presence of sodium gluconate. Based on a comparison between Comparative Example 11 and Example 1, it is understood that the combined use of AS-5 and sodium gluconate can enhance the washing effect.

Further, in Example 2, in which propylene glycol was added, the washing effect was further improved.

Although the present invention has been described in detail with reference to particular embodiments, it will be apparent to those skilled in the art that various modifications can be made without departing from the spirit and scope of the invention.

This application is based on Japanese Patent Application No. 2017-042999 filed on Mar. 7, 2017, which is incorporated herein by reference in its entirety.

REFERENCE SIGNS LIST 1 container
2 flat membrane cell
2A RO membrane
2B porous support plate
3 stirrer
4 high-pressure pump
5 stir bar
6 pressure gauge
7 pressure regulating valve
8 O-ring

The invention claimed is:

1. A solution-type water treatment chemical, comprising, as one component, gluconic acid and/or a salt thereof (hereinafter referred to as "gluconic acid (salt)") and an anionic surfactant having an HLB determined by the following equation (1) satisfying the following equation (2), wherein in a relationship between concentrations of the gluconic acid (salt) and the surfactant and a molecular weight and HLB of the surfactant, the gluconic acid (salt) and the surfactant are contained such that the water treatment chemical does not form a gel or precipitate:

$$HLB = (\Sigma\text{inorganic value}/\Sigma\text{organic value}) \times 10 \quad (1)$$

$$\text{Molecular weight} > -34.4 \times HLB + 1005 \quad (2),$$

the anionic surfactant being one of:

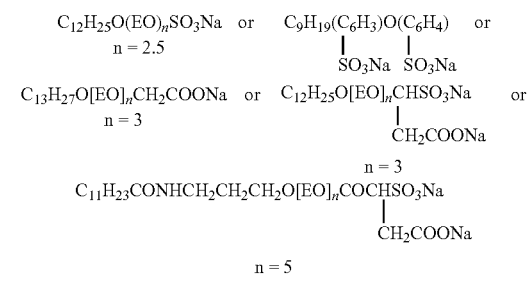

$C_6H_4, C_6H_3$: benzene ring,
EO: ethylene oxide group.

2. The water treatment chemical according to claim 1, wherein the water treatment chemical does not form a gel or precipitate at a solution temperature of 6° C. or less.

3. The water treatment chemical according to claim 1, wherein the gluconic acid (salt) has a concentration of 20 wt % or less and the surfactant has a concentration of 10 wt % or less.

4. The water treatment chemical according to claim 1, further comprising an alkali agent.

5. The water treatment chemical according to claim 1, further comprising a polyol compound having a molecular weight of 1000 or less.

6. A washing liquid for a polyamide reverse osmosis membrane, comprising the water treatment chemical according to claim 1.

7. A method for washing a polyamide reverse osmosis membrane using the washing liquid according to claim 6.

8. A method for preparing a solution-type water treatment chemical comprising, as one component, gluconic acid and/or a salt thereof (hereinafter referred to as "gluconic acid (salt)") and an anionic surfactant having an HLB determined by the following equation (1) satisfying the following equation (2);
  wherein in a relationship between concentrations of the gluconic acid (salt) and the surfactant and a molecular weight and HLB of the surfactant, the gluconic acid (salt) and the surfactant are mixed such that the water treatment chemical does not form a gel or precipitate:

$$HLB = (\Sigma \text{inorganic value}/\Sigma \text{organic value}) \times 10 \quad (1)$$

$$\text{Molecular weight} > -34.4 \times HLB + 1005 \quad (2),$$

the anionic surfactant being one of:

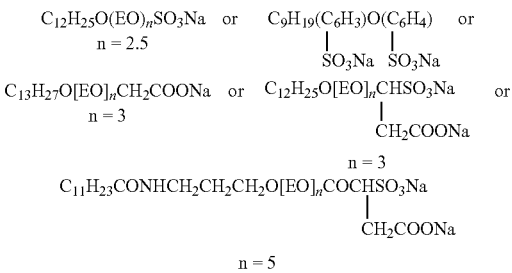

$C_6H_4, C_6H_3$: benzene ring,
EO: ethylene oxide group.

9. The method for preparing a water treatment chemical according to claim 8, wherein the water treatment chemical does not form a gel or precipitate at a solution temperature of 6° C. or less.

10. The method for preparing a water treatment chemical according to claim 8, wherein the gluconic acid (salt) is mixed so as to have a concentration of 20 wt % or less and the surfactant is mixed so as to have a concentration of 10 wt % or less.

11. The method for preparing a water treatment chemical according to, further comprising mixing an alkali agent.

12. The method for preparing a water treatment chemical according to claim 8, further comprising mixing a polyol compound having a molecular weight of 1000 or less.

13. A method for preparing a washing liquid for a polyamide reverse osmosis membrane, the method comprising preparing the washing liquid for a polyamide reverse osmosis membrane by the method according to claim 8.

14. A method for washing a polyamide reverse osmosis membrane, the method comprising washing a polyamide reverse osmosis membrane by using the washing liquid for a polyamide reverse osmosis membrane prepared by the method according to claim 13.

15. The water treatment chemical according to claim 1, wherein a concentration of the anionic surfactant is 0.01 to 5 wt %, and a concentration of the gluconic acid (salt) is 10 to 20 wt %.

16. The water treatment chemical according to claim 1, wherein the gluconic acid is sodium gluconate, and is mixed with the anionic surfactant in a 48 wt % sodium hydroxide.

17. The water treatment chemical according to claim 16, wherein the anionic surfactant contains an ethylene oxide group as a hydrophobic group and has HLB of 17.5 or more.

* * * * *